(12) United States Patent
Ehira

(10) Patent No.: US 11,245,835 B2
(45) Date of Patent: Feb. 8, 2022

(54) ELECTRONIC DEVICE

(71) Applicant: CANON KABUSHIKI KAISHA, Tokyo (JP)

(72) Inventor: Tatsuya Ehira, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/850,521

(22) Filed: Apr. 16, 2020

(65) Prior Publication Data

US 2020/0336650 A1   Oct. 22, 2020

(30) Foreign Application Priority Data

Apr. 18, 2019 (JP) .............................. JP2019-079152

(51) Int. Cl.
*H04N 5/232* (2006.01)
*G03B 17/02* (2021.01)

(52) U.S. Cl.
CPC ......... *H04N 5/23216* (2013.01); *G03B 17/02* (2013.01); *H04N 5/23212* (2013.01); *H04N 5/232939* (2018.08)

(58) Field of Classification Search
CPC ........... H04N 5/23216; H04N 5/23212; H04N 5/232939; H04N 5/232945; H04N 5/232127; G03B 17/02; G03B 2206/00; G03B 17/563
See application file for complete search history.

(56) References Cited

U.S. PATENT DOCUMENTS

| | | | | |
|---|---|---|---|---|
| 7,821,563 | B2* | 10/2010 | Tanaka | G06F 3/0362 348/333.12 |
| 2008/0240694 | A1* | 10/2008 | Okazaki | G03B 17/18 396/50 |
| 2009/0034956 | A1* | 2/2009 | Tomosada | G03B 13/36 396/131 |
| 2016/0361641 | A1* | 12/2016 | Koizumi | G06F 3/011 |
| 2019/0141258 | A1* | 5/2019 | Yoshida | H04N 5/22525 |
| 2020/0073205 | A1* | 3/2020 | Matsushima | H04N 5/23216 |

FOREIGN PATENT DOCUMENTS

JP          2013-055452 A          3/2013

* cited by examiner

*Primary Examiner* — Gevell V Selby
(74) *Attorney, Agent, or Firm* — Cowan, Liebowitz & Latman, P.C.

(57) ABSTRACT

An electronic device includes: a first operation member; a second operation member; and at least one memory and at least one processor which function as: a control unit configured to perform control so as to execute a predetermined function in accordance with an operation to the first operation member and to execute the predetermined function in accordance with an operation to the second operation member, and, in a case where operations to both the first operation member and the second operation member are made, to execute the predetermined function in accordance with the operation to the first operation member without responding to the operation to the second operation member.

14 Claims, 8 Drawing Sheets

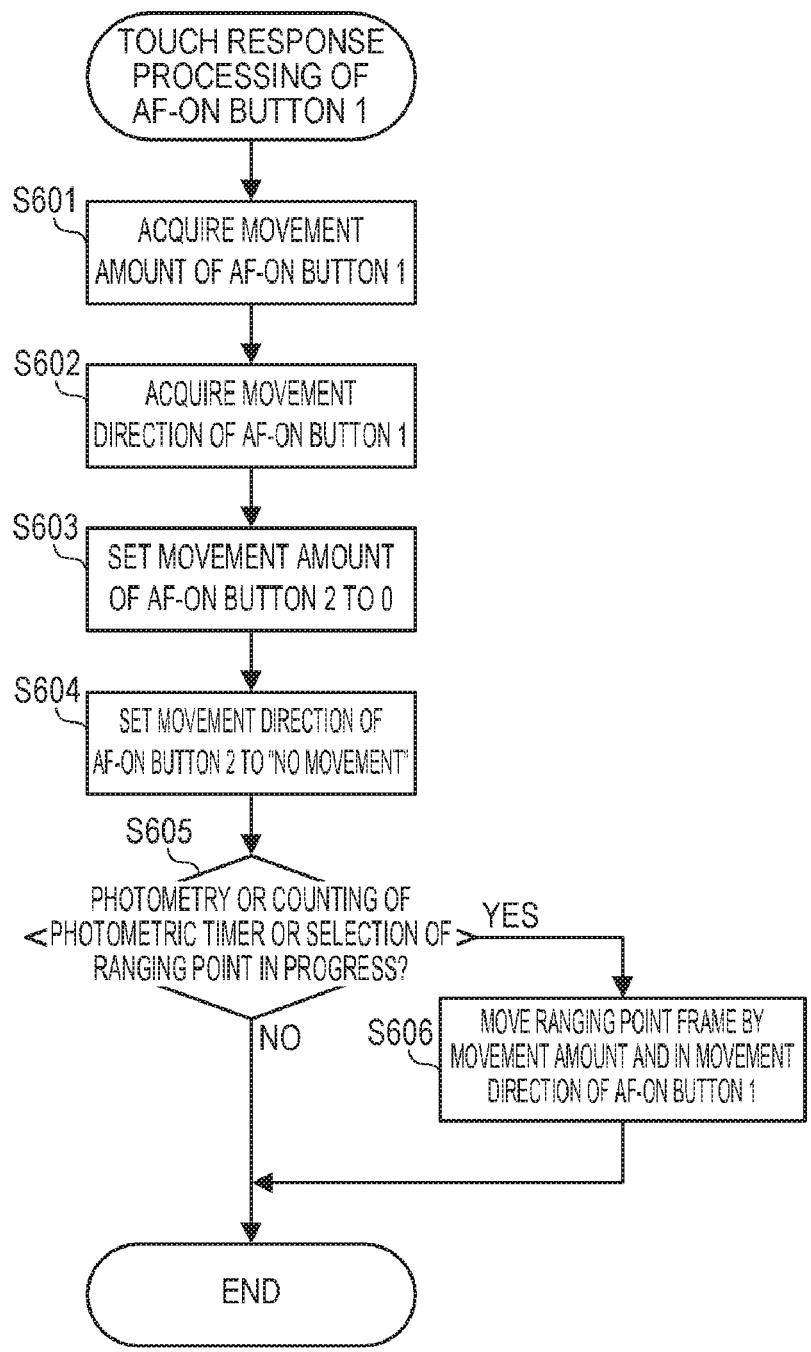

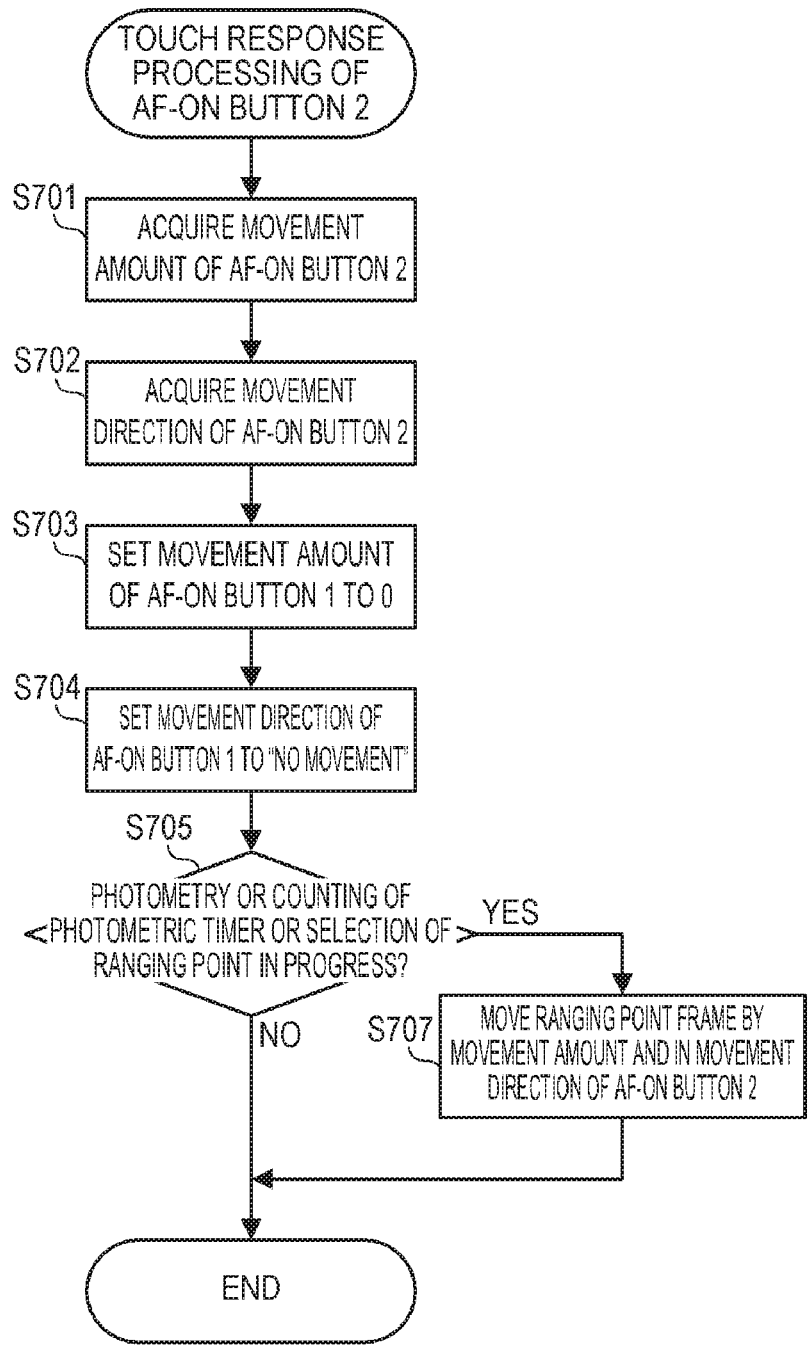

ELECTRONIC DEVICE

BACKGROUND OF THE INVENTION

Field of the Invention

The present invention relates to an electronic device such as an imaging apparatus and, particularly, to a technique for preventing a malfunction (an unintended action) due to a misoperation (an unintended operation).

Description of the Related Art

Control methods and the like have been proposed for preventing a malfunction due to a misoperation of an imaging apparatus having a plurality of touch panels or a misoperation with respect to the plurality of touch panels. For example, Japanese Patent Application Laid-open No. 2013-55452 discloses a method of switching between enabling and disabling an operation with respect to each of a plurality of touch panels on the basis of a detection result of an orientation of an imaging apparatus in order to prevent a malfunction due to a misoperation with respect to the plurality of touch panels.

However, with the method disclosed in Japanese Patent Application Laid-open No. 2013-55452, since there is a possibility that an orientation is falsely detected when the imaging apparatus faces directly downward or directly upward, unintended switching between enabling and disabling an operation with respect to each touch panel occurs. In addition, no consideration is given to misoperations such as the palm of a hand coining into contact with a touch panel when operating another touch panel.

SUMMARY OF THE INVENTION

The present invention provides an electronic device that reduces the possibility of an occurrence of a malfunction (an unintended action) due to a misoperation (an unintended operation).

An electronic device according to the present invention includes: a first operation member which is operatable by a thumb of a hand holding a first grip portion provided along a first side on a first surface of the electronic device; a second operation member which is disposed at a position where the second operation member is operatable by a thumb of a hand holding a second grip portion provided along a second side that is adjacent to the first side on the first surface, the position being closer to a vertex formed by the first side and the second side than to other vertices on the first surface; and at least one memory and at least one processor which function as: a control unit configured to perform control so as to execute a predetermined function in accordance with an operation to the first operation member and to execute the predetermined function in accordance with an operation to the second operation member, and, in a case where operations to both the first operation member and the second operation member are made, to execute the predetermined function in accordance with the operation to the first operation member without responding to the operation to the second operation member.

Further features of the present invention will become apparent from the following description of exemplary embodiments with reference to the attached drawings.

BRIEF DESCRIPTION OF THE DRAWINGS

FIG. 6 is a flow chart of touch response processing according to the present embodiment;

FIG. 7 is a flow chart of the touch response processing according to the present embodiment.

DESCRIPTION OF THE EMBODIMENTS

Figure 1A:
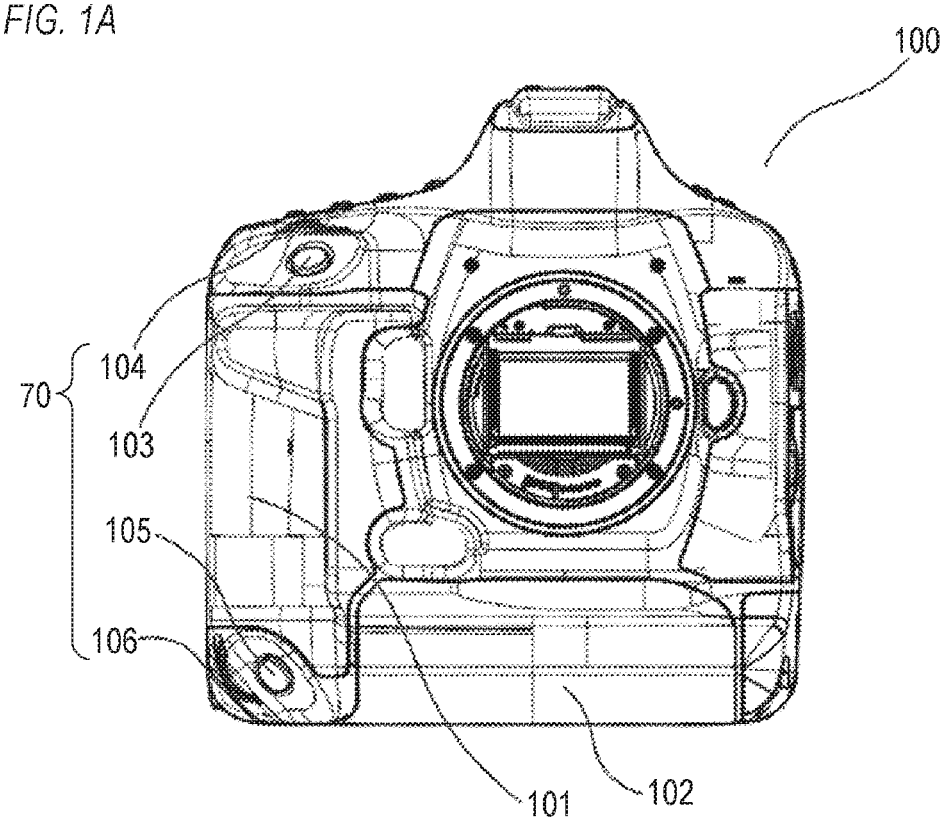
FIGS. 1A and 1B are external views of a camera according to an embodiment.
Figure 1B:
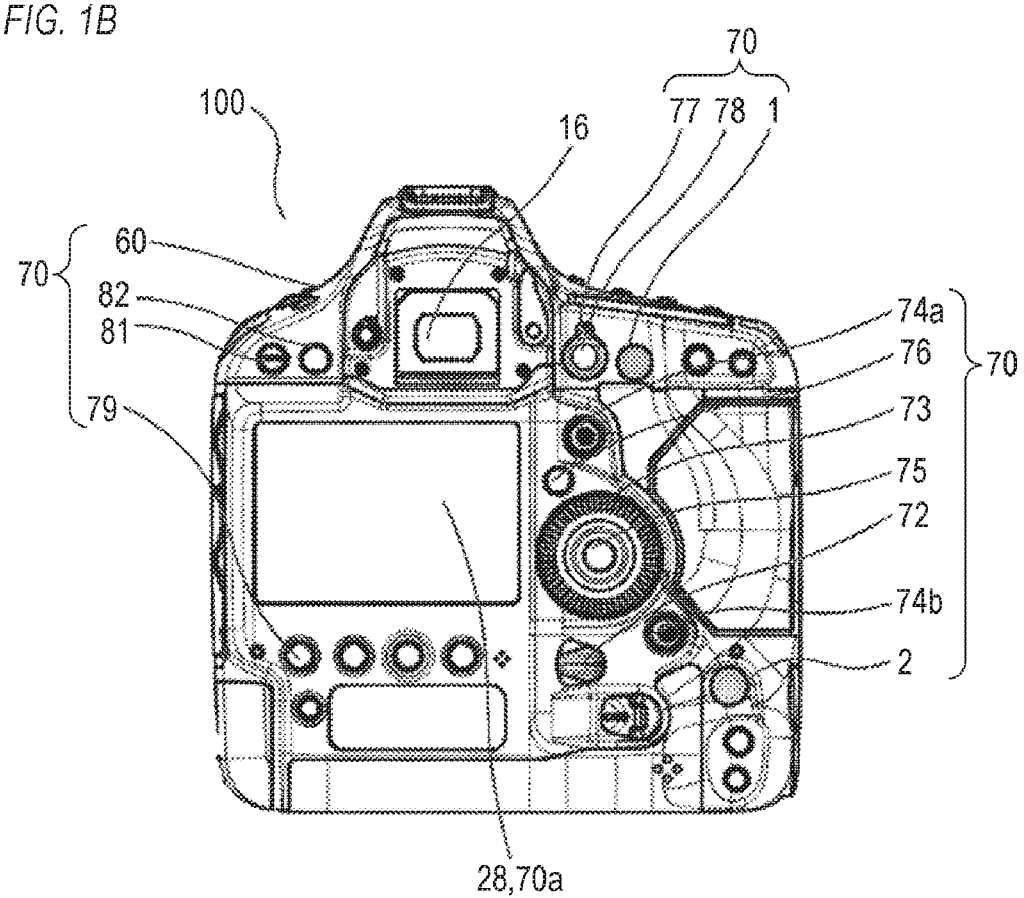

Hereinafter, a preferred embodiment of the present invention will be described in detail with reference to the accompanying drawings. FIGS. 1A and 1B are external views of a main body of a single-lens reflex camera (hereinafter, referred to as a camera) 100 as an example of an imaging apparatus (which is an electronic device) to which the present invention is applicable. Specifically, FIG. 1A is a diagram in which the camera 100 is viewed from a first surface (a front surface) side and which shows a state where a photographing lens unit has been removed. FIG. 1B is a diagram in which the camera 100 is viewed from a second surface (a rear surface). The first surface is a camera front surface which is a surface on an object side (a surface on a side of an image sensing direction). The second surface is a rear surface of the camera which is a surface on a rear side (opposite side) of the first surface and a surface on a side of a photographer who looks into a finder 16.

As shown in FIG. 1A, the camera 100 is provided with a first grip portion 101 that protrudes forward so that a user of the camera 100 can grasp and handle the camera 100 in a stable manner when performing photography while laterally holding the camera 100. In addition, the camera 100 is provided with a second grip portion 102 that protrudes forward so that the user of the camera 100 can grasp and handle the camera 100 in a stable manner when performing photography while vertically holding the camera 100. The first grip portion 101 is parallel to a first side (a side on a left side among two vertical sides to the left and right in FIG. 1A) of the front surface of the camera 100, and the second grip portion 102 is parallel to a second side (a side on a lower side among two lateral sides at the top and bottom in FIG. 1A) which is adjacent to the first side of the front surface. Shutter buttons 103 and 105 are operating members for issuing photography instructions. Main electronic dials 104 and 106 are rotating operating members and, by turning the main electronic dials 104 and 106, setting values such as a shutter speed and an aperture can be changed. The shutter buttons 103 and 105 and the main electronic dials 104 and 106 are included in an operating unit 70. The shutter button 103 and the main electronic dial 104 can be mainly used for laterally-held photography and the shutter button 105 and the main electronic dial 106 can be mainly used for vertically-held photography.

In FIG. 1B, a display unit 28 displays images and various types of information. The display unit 28 is provided so as to be superimposed on, or integrated with, a touch panel 70a that is capable of accepting a touch operation (capable of touch detection). AF-ON buttons 1 and 2 are operating members for setting a focal adjustment position or starting AF and are included in the operating unit 70. In the present embodiment, the AF-ON buttons 1 and 2 are touch operation members (in the present embodiment, infrared sensors) capable of accepting a touch operation and a depressing operation. Such an operating member adopting an optical system will be referred to as an optical tracking pointer (OTP). While laterally holding the camera 100 (in a state where the camera 100 is held at a lateral position) and looking into the finder 16, the user can perform a touch operation or a slide operation in any two-dimensional direction with respect to the AF-ON button 1 using the thumb of the right hand that is gripping the first grip portion 101. In addition, while vertically holding the camera 100 and looking into the finder 16, the user can perform a touch operation or a slide operation in any two-dimensional direction with respect to the AF-ON button 2 using the thumb of the right hand that is gripping the second grip portion 102. Vertically holding the camera 100 refers to a state where the camera 100 is held at a vertical position that differs from the lateral position by 90 degrees. With a slide operation with respect to the AF-ON button 1 or the AF-ON button 2, the user operating the camera 100 can move a ranging point frame (a position of an AF frame used for AF, a focal adjustment position, a focus detection position) displayed on the display unit 28. In addition, with a depressing operation with respect to the AF-ON button 1 or the AF-ON button 2, the user can immediately start AF on the basis of the position of the ranging point frame. The AF-ON button 1 can be mainly used for laterally-held photography and the AF-ON button 2 can be mainly used for vertically-held photography.

An arrangement of the AF-ON buttons 1 and 2 will be described. As shown in FIG. 1B, the AF-ON buttons 1 and 2 are disposed on a rear surface of the camera 100. In addition, the AF-ON button 2 is disposed at a position that is closer to a vertex formed by a side (the first side) parallel to the first grip portion 101 and a side (the second side) parallel to the second grip portion 102 than to other vertices among the rear surface of the camera 100. Furthermore, the AF-ON button 2 is disposed at a position that is closer to the vertex formed by the side parallel to the first grip portion 101 and the side parallel to the second grip portion 102 than to the AF-ON button 1. The side (the first side) parallel to the first grip portion 101 among the rear surface of the camera 100 is a side on a right side among two vertical sides to the left and right in FIG. 1B. The side (the second side) parallel to the second grip portion 102 among the rear surface of the camera 100 is a side on a lower side among two lateral sides at the top and the bottom in FIG. 1B. In this case, when the rear surface of the camera 100 is considered a polygon, the vertex described above is a vertex of the polygon (a virtual vertex). If the rear surface of the camera 100 is a perfect polygon, the vertex described above may be a vertex of the polygon (an actual vertex of the camera 100). The first side is a side (a vertical side) on the right side in a left-right direction in FIG. 1B, the second side is a side (a lateral side) on the lower side in an up-down direction in FIG. 1B, and the vertex described above which is formed by the first side and the second side is a lower right vertex in FIG. 1B. Furthermore, the AF-ON button 2 is disposed at a position that is closer to an end (a lower end) on an opposite side than to an end (in other words, an upper end) on a side where the AF-ON button 1 is present among the side (the first side) parallel to the first grip portion 101. In addition, the shutter button 103 described earlier is disposed at a position where the shutter button 103 can be operated (can be depressed) by the index finger of the right hand gripping the first grip portion 101, and the shutter button 105 described earlier is disposed at a position where the shutter button 105 can be operated by the index finger of the right hand gripping the second grip portion 102. Furthermore, the AF-ON button 1 is disposed at a position that is closer to the shutter button 103 than the AF-ON button 2 is, and the AF-ON button 2 is disposed at a position that is closer to the shutter button 105 than the AF-ON button 1 is.

It should be noted that the AF-ON buttons 1 and 2 are operating members that differ from the touch panel 70a and are not equipped with a display function. In addition, while an example in which an indicator (an AF frame) which indicates a ranging position selected by an operation with respect to the AF-ON buttons 1 and 2 is to be moved will be described below, a function that is executed in response to an operation with respect to the AF-ON buttons 1 and 2 is not particularly limited. For example, the indicator to be moved by a slide operation with respect to the AF-ON buttons 1 and 2 may be any indicator as long as the indicator can be displayed on the display unit 28 and can be moved. For example, the indicator may be a pointing cursor such as a mouse cursor or a cursor that indicates a selected option among a plurality of options (such as a plurality of items displayed on a menu screen). Different indicators may be moved by a slide operation with respect to the AF-ON button 1 and a slide operation with respect to the AF-ON button 2. Functions to be executed by a depressing operation with respect to the AF-ON buttons 1 and 2 may be other functions related to functions to be executed by a slide operation with respect to the AF-ON buttons 1 and 2.

A mode changeover switch 60 is an operating member for switching between various modes. A power supply switch 72 is an operating member for switching a power supply of the camera 100 on and off. A sub electronic dial 73 is a rotating operating member for moving a selection frame, scrolling through images, and the like. 8-way keys 74a and 74b are, respectively, operating members which can be detruded in upward, downward, leftward, rightward, upward left, downward left, upward right, and downward right directions and which enable processing in accordance with a direction in which the 8-way keys 74a and 74b are detruded to be performed. The 8-way key 74a can be mainly used for laterally-held photography and the 8-way key 74b can be mainly used for vertically-held photography. A SET button 75 is an operating member which is mainly used to determine a selected item and the like. A still image/moving image changeover switch 77 is an operating member for switching between a still image photography mode and a moving image photography mode. An LV button 78 is an operating member for switching a live view (hereinafter, an LV) on and off. When LV is switched on, an LV mode is entered in which a mirror 12 (to be described later) moves (mirror-up) to a retracted position where the mirror 12 retracts from an optical axis, object light is guided to an imaging unit 22 (to be described later), and sensing of an LV image is performed. In the LV mode, an object image can be confirmed by an LV image. When LV is switched off, an OVF mode is entered in which the mirror 12 moves (mirror-down) onto the optical axis and the object light is reflected, the object light is guided to the finder 16, and an optical image of the object (an optical object image) becomes visible from the finder 16. A playback button 79 is an operating member for switching between a photography mode (a photography screen) and a playback mode (a playback screen). By depressing the playback button 79 in the photography mode, a transition can be made to the playback mode and a latest image among images recorded in a recording medium 200 (to be described later with reference to FIG. 2) can be displayed on the display unit 28. A Q button 76 is an operating member for configuring a quick setting and, by depressing the Q button 76 on the photography screen, setting items having been displayed as a list of setting values becomes selectable and, by selecting the setting items, a transition can be made to setting screens of the respective setting items. The mode changeover switch 60, the power supply switch 72, the sub electronic dial 73, the 8-way keys 74a and 74b, the SET button 75, the Q button 76, the still image/moving image changeover switch 77, the LV button 78, and the playback button 79 are included in the operating unit 70. A menu button 81 is an operating member which is included in the operating unit 70 and which is used to configure various settings of the camera 100. When the menu button 81 is pushed, a menu screen enabling various settings to be configured is displayed on the display unit 28. The user can intuitively configure various settings using the menu screen displayed on the display unit 28 together with the sub electronic dial 73, the 8-way keys 74a and 74b, the SET button 75, and the main electronic dials 104 and 106. The finder 16 is a look-in (eyepiece-type) finder for checking a focus and a composition of an optical image of an object obtained through a lens unit. An INFO button 82 is included in the operating unit 70 and is capable of displaying various types of information of the camera 100 on the display unit 28.

Figure 2:
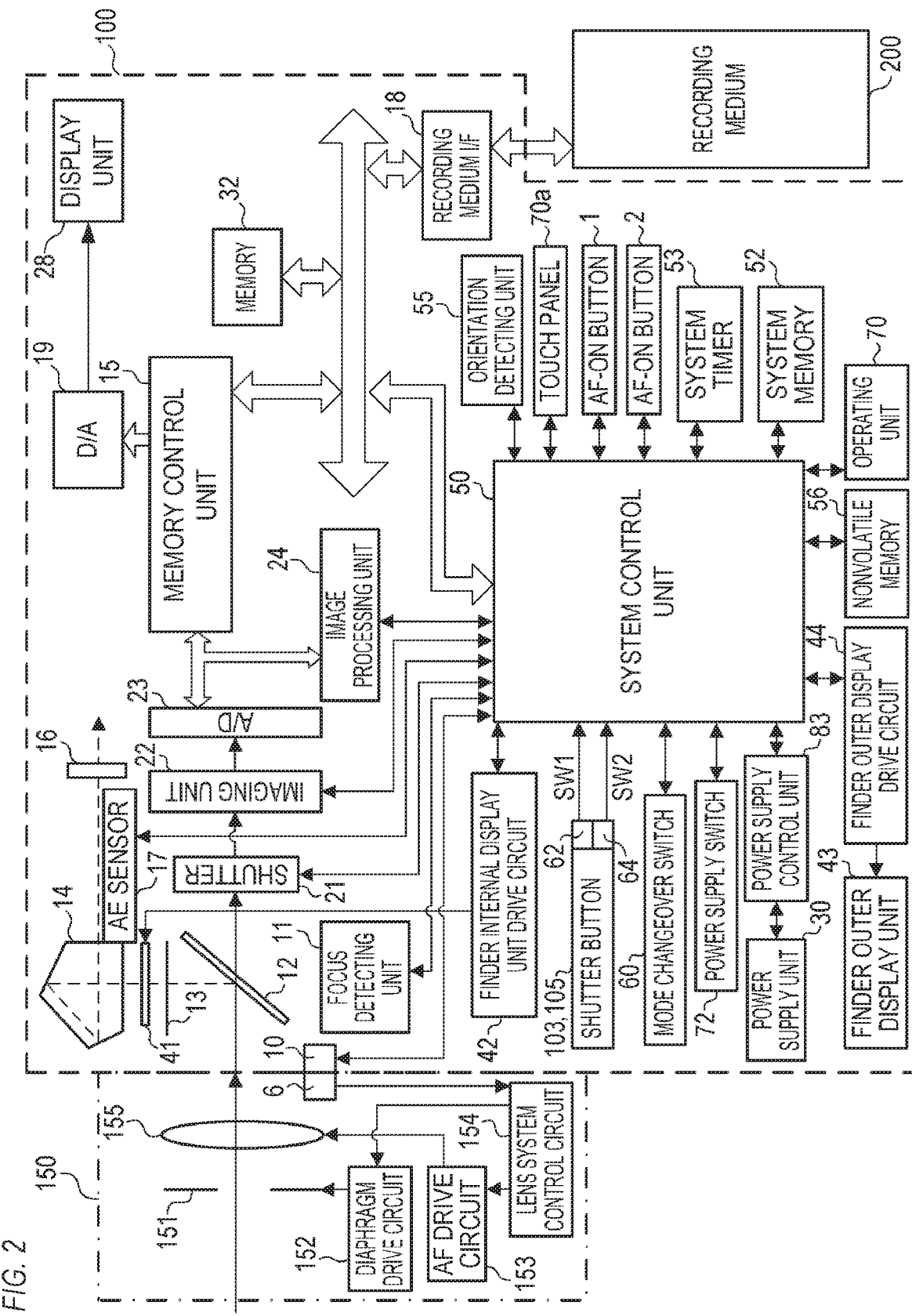
FIG. 2 is a block diagram showing a configuration example of a camera according to the present embodiment.

FIG. 2 is a block diagram showing a configuration example of the camera 100.

A lens unit 150 is a lens unit mounted with a replaceable photographing lens. While a lens 155 is usually configured by a plurality of lenses such as a focusing lens group or a zoom lens group, in FIG. 2, the lens 155 is shown simplified with only one lens. A communication terminal 6 is a communication terminal used by the lens unit 150 to communicate with the camera 100, and the communication terminal 10 is a communication terminal used by the camera 100 to communicate with the lens unit 150. The lens unit 150 communicates with a system control unit 50 via the communication terminals 6 and 10. Furthermore, the lens unit 150 performs focusing by using an internal lens system control circuit 154 to control a diaphragm 151 via a diaphragm drive circuit 152 and displace a position of the lens 155 via an AF drive circuit 153. The lens unit 150 is mounted to a main body side that includes the display unit 28 via a mounting portion that enables the lens unit 150 to be mounted. As the lens unit 150, lens units of various types such as a prime lens or a zoom lens can be mounted.

An AE sensor 17 measures brightness of the object (object light) of which an image is formed on a focusing screen 13 through the lens unit 150 and a quick return mirror 12.

A focus detecting unit 11 is a phase difference detection system AF sensor which senses an image (object light) incident via the quick return mirror 12 and which outputs defocus amount information to the system control unit 50. The system control unit 50 controls the lens unit 150 on the basis of the defocus amount information to perform phase difference AF. A method of AF is not limited to phase difference AF and may instead be contrast AF. In addition, phase difference AF may be performed on the basis of a defocus amount detected on an image sensing surface of the imaging unit 22 (image sensing surface phase difference AF) instead of using the focus detecting unit 11.

The quick return mirror 12 (hereinafter, the mirror 12) is raised and lowered by an actuator (not illustrated) under instructions from the system control unit 50 during exposure, live view photography, and moving image photography. The mirror 12 is a mirror for switching a luminous flux incident from the lens 155 between a side of the finder 16 and a side of the imaging unit 22. While the mirror 12 is normally disposed so as to guide (reflect) the luminous flux to the finder 16 (mirror down), when photography and live view display are performed, the mirror 12 is flipped upward so as to guide the luminous flux to the imaging unit 22 and is retracted from inside the luminous flux (mirror up). In addition, the mirror 12 is configured as a half mirror so that light can be partially transmitted through a central portion thereof, and the mirror 12 causes a part of the luminous flux to be transmitted and incident to the focus detecting unit 11 for performing focus detection.

By observing an image formed on the focusing screen 13 via a pentaprism 14 and the finder 16, the user can check a focal state and a composition of an optical image of an object obtained through the lens unit 150.

A focal plane shutter 21 (a shutter 21) is for controlling an exposure time of the imaging unit 22 under the control of the system control unit 50.

The imaging unit 22 is an image sensing element (an image sensor) constituted by a device such as a CCD or a CMOS which converts an optical image into an electrical signal. An A/D converter 23 is used to convert an analog signal output from the imaging unit 22 into a digital signal.

An image processing unit 24 performs predetermined processing (pixel interpolation, resizing processing such as reduction, and color conversion processing) with respect to data from the A/D converter 23 or data from a memory control unit 15. In addition, the image processing unit 24 performs predetermined computing processing using image data of a captured image, and the system control unit 50 performs exposure control and ranging control based on a computation result obtained by the image processing unit 24. Accordingly, automatic focusing (AF) processing, automatic exposure (AE) processing, and preliminary light emission before flash (EF) processing in a through-the-lens (TM) system are performed. The image processing unit 24 further performs predetermined computing processing using image data of a captured image and performs automatic white balance (AWB) processing in the TTL system based on an obtained computation result.

A memory 32 stores image data obtained by the imaging unit 22 and converted into digital data by the A/D converter 23 and image data to be displayed on the display unit 28. The memory 32 has sufficient storage capacity for storing a predetermined number of still images and a predetermined time's worth of moving images and audio. The memory 32 may be an attachable/detachable recording medium such as a memory card or may be an internal memory.

The display unit 28 is a rear monitor for displaying images and is provided on the rear surface of the camera 100 as shown in FIG. 1B. A D/A converter 19 converts data for image display stored in the memory 32 into an analog signal and supplies the analog signal to the display unit 28. The display unit 28 may be a liquid crystal system display or a display adopting other systems such as organic EL as long as the display displays images.

A finder internal display unit 41 displays, via a finder internal display unit drive circuit 42, a frame (an AF frame) indicating a ranging point on which automatic focusing is currently being performed, icons representing a setting state of the camera, and the like. Various setting values of the camera 100 including a shutter speed and an aperture are displayed on a finder outer display unit 43 via a finder outer display unit drive circuit 44.

An orientation detecting unit 55 is a sensor for detecting an orientation due to an angle of the camera 100. Based on an orientation detected by the orientation detecting unit 55, a determination can be made as to whether an image photographed by the imaging unit 22 is an image photographed while holding the digital camera 100 laterally or an image photographed while holding the digital camera 100 vertically. The system control unit 50 can add orientation information in accordance with the orientation detected by the orientation detecting unit 55 to an image file of the image sensed by the imaging unit 22, record a rotated version of the image, and the like. An acceleration sensor, a gyro sensor, or the like can be used as the orientation detecting unit 55. A motion (panned, tilted, uplifted, whether stationary or not, and the like) of the camera 100 can also be detected using the acceleration sensor or the gyro sensor that constitutes the orientation detecting unit 55.

A nonvolatile memory 56 is a memory that is electrically erasable and recordable by the system control unit 50 and, for example, an EEPROM is used. Constants, a program, and the like for operations of the system control unit 50 are stored in the nonvolatile memory 56. In this case, the program refers to a program for executing the various flow charts described later in the present embodiment.

The system control unit 50 has at least one built-in processor (including circuits) and controls the entire camera 100. The system control unit 50 realizes the respective processing of the present embodiment (to be described later) by executing the program recorded in the nonvolatile memory 56 described earlier. Constants and variables for the operations of the system control unit 50, the program read from the nonvolatile memory 56, and the like are deployed onto a system memory 52. In addition, the system control unit 50 also performs display control by controlling the memory 32, the D/A converter 19, the display unit 28, and the like.

A system timer 53 is a time-measuring unit for measuring time used in various controls and for measuring time according to an internal clock. The mode changeover switch 60 switches an operating mode of the system control unit 50 to any of a still image photography mode, a moving image photography mode, and the like. The still image photography mode includes a P mode (program AE) and an M mode (manual). Alternatively, after temporarily switching to a menu screen using the mode changeover switch 60, another operating member may be used to switch to any of the modes included in the menu screen. In a similar manner, the moving image photography mode may also include a plurality of modes. In the M mode, the user can set an aperture value, a shutter speed, and ISO sensitivity and can perform photography at a desired exposure.

A first shutter switch 62 is switched on during an operation of the shutter buttons 103 and 105 provided on the camera 100 by a so-called half-press (a photography preparation instruction) and generates a first shutter switch signal SW1. In accordance with the first shutter switch signal SW1, the system control unit 50 starts operations such as automatic focusing (AF) processing, automatic exposure (AE) processing, automatic white balance (AWB) processing, and preliminary light emission before flash (EF) processing. In addition, the system control unit 50 also performs photometry using the AE sensor 17.

A second shutter switch 64 is turned on upon completion of an operation of the shutter buttons 103 and 105 by a so-called full-press (a photography instruction) and generates a second shutter switch signal SW2. In accordance with the second shutter switch signal SW2, the system control unit 50 starts a series of operations of photography processing from reading a signal from the imaging unit 22 to recording an image on the recording medium 200 as an image file.

A power supply control unit 83 is constituted by a battery detection circuit, a DC-DC converter, a switching circuit for switching between blocks to be energized, and the like, and detects whether or not a battery is mounted, a type of the battery, and a remaining battery level. In addition, the power supply control unit 83 controls the DC-DC converter on the basis of the detection results and an instruction from the system control unit 50 and supplies respective units including the recording medium 200 with necessary voltage for a necessary period of time. The power supply switch 72 is a switch for switching the power supply of the camera 100 on and off.

A power supply unit 30 is constituted by a primary battery such as an alkaline battery or a lithium battery, a secondary battery such as a NiCd battery, a NiMH battery, or a Li battery, an AC adapter, or the like. A recording medium I/F 18 is an interface with the recording medium 200 that is a memory card, a hard disk, or the like. The recording medium 200 is a recording medium such as a memory card for recording photographed images and is constituted by a semiconductor memory, a magnetic disk, or the like.

As described above, the camera 100 has the touch panel 70a which is capable of detecting a contact made with respect to the display unit 28 (the touch panel 70a) as one operating unit 70. The touch panel 70a and the display unit 28 can be integrally constructed. For example, the touch panel 70a is configured such that transmittance of light does not obstruct display by the display unit 28 and is mounted to an upper layer of a display surface of the display unit 28. Subsequently, input coordinates on the touch panel 70a and display coordinates on the display unit 28 are associated with each other. Accordingly, a graphical user interface (GUI) can be configured which enables the user to feel as if a screen displayed on the display unit 28 can be directly operated. The system control unit 50 is capable of detecting the following touch operations with respect to the touch panel 70a or the following states of the touch panel 70a.

A new touch on the touch panel 70a by a finger or a stylus previously not in touch with the touch panel 70a. In other words, a start of a touch (hereinafter referred to as a touch-down).

A state where the touch panel 70a is being touched by a finger or a stylus (hereinafter referred to as a touch-on).

A state where a finger or a stylus is moving while in touch with the touch panel 70a (hereinafter referred to as a touch-move).

A state where a finger or a stylus previously in touch with the touch panel 70a separates from the touch panel 70a. In other words, an end of a touch (hereinafter referred to as a touch-up).

A state where nothing is touching the touch panel 70a (hereinafter referred to as a touch-off).

When a touch-down is detected, a touch-on is simultaneously detected. Normally, after a touch-down, a touch-on is continuously detected unless a touch-up is detected. A detection of a touch-move is also a state where a touch-on is detected. Even when a touch-on is detected, a touch-move is not detected unless a touch position moves. A touch-off occurs after a touch-up is detected for all of the fingers or a stylus previously in touch.

The system control unit 50 is notified of the operation and states described above as well as a position coordinate where a finger or a stylus touches the touch panel 70a through an internal bus and, based on the notified information, the system control unit 50 determines what kind of an operation has been performed on the touch panel 70a. With respect to a touch-move, a movement direction of a finger or a stylus moving on the touch panel 70a can be determined for each of a vertical component and a horizontal component on the touch panel 70a on the basis of a change in the position coordinate. In addition, when a touch-up is performed after a touch-move by a certain distance from a touch-down on the touch panel 70a, it is assumed that a stroke has been drawn. An operation that involves drawing a quick stroke is referred to as a flick. A flick is an operation involving quickly moving a finger on the touch panel 70a over a certain distance while keeping the finger in touch with the touch panel 70a and then releasing the finger or, in other words, an operation in which a finger quickly traces the touch panel 70a as though flicking on the touch panel 70a. A determination that a flick has been performed can be made when a detection of a touch-move of a predetermined distance or more at a predetermined speed or more is followed by a detection of a touch-up. In addition, it is assumed that a determination that a drag has been performed is made when a touch-move of the predetermined distance or more at a speed below the predetermined speed is detected. As the touch panel 70a, a touch panel adopting any of various systems including a resistive film system, a capacitance system, a surface acoustic wave system, an infrared system, an electromagnetic induction system, an image recognition system, and an optical sensor system may be used. Any of a system in which a touch is detected when contact is made with the touch panel and a system in which a touch is detected when a finger or a stylus approaches the touch panel may be adopted.

The system control unit 50 is capable of detecting a touch operation or a depressing operation with respect to the AF-ON buttons 1 and 2 on the basis of a notification (output information) from the AF-ON buttons 1 and 2. On the basis of output information of the AF-ON buttons 1 and 2, the system control unit 50 calculates a direction of movement (hereinafter, referred to as a movement direction) of a finger or the like on the AF-ON buttons 1 and 2 in eight directions including upward, downward, leftward, rightward, upward left, downward left, upward right, and downward right directions. In addition, on the basis of output information of the AF-ON buttons 1 and 2, the system control unit 50 calculates an amount of movement (hereinafter, referred to as a movement amount (x, y)) of a finger or the like on the AF-ON buttons 1 and 2 in a two-dimensional direction constituted by an x-axis direction and a y-axis direction. Furthermore, the system control unit 50 is capable of detecting the following operations on the AF-ON buttons 1 and 2 or the following states of the AF-ON buttons 1 and 2. With respect to each of the AF-ON button 1 and the AF-ON button 2, the system control unit 50 individually calculates a movement direction and a movement amount (x, y) or detects the following operations or states.

A new touch on the AF-ON button 1 or the AF-ON button 2 by a finger or the like previously not in touch with the AF-ON button 1 or the AF-ON button 2. In other words, a start of a touch (hereinafter referred to as a touch-down).

A state where the AF-ON button 1 or the AF-ON button 2 is being touched by a finger or the like (hereinafter referred to as a touch-on).

A finger or the like moving while in touch with the AF-ON button 1 or the AF-ON button 2 (hereinafter referred to as a touch-move).

A state where a finger or the like previously in touch with the AF-ON button 1 or the AF-ON button 2 separates from the AF-ON button 1 or the AF-ON button 2. In other words, an end of a touch (hereinafter referred to as a touch-up).

A state where nothing is touching the AF-ON button 1 or the AF-ON button 2 (hereinafter referred to as a touch-off).

When a touch-down is detected, a touch-on is simultaneously detected. Normally, after a touch-down, a touch-on is continuously detected unless a touch-up is detected. A detection of a touch-move is also a state where a touch-on is detected. Even when a touch-on is detected, a touch-move is not detected when the movement amount (x, y) is 0. A touch-off occurs after a touch-up is detected for all of the fingers or the like previously in touch.

On the basis of the operations or states described above or a movement direction and a movement amount (x, y), the system control unit 50 determines what kind of operation (touch operation) has been performed on the AF-ON buttons 1 and 2. With respect to a touch-move, a movement in eight directions including upward, downward, leftward, rightward, upward left, downward left, upward right, and downward right directions or a two-dimensional direction constituted by the x-axis direction and the y-axis direction is detected as a movement of a finger or the like on the AF-ON buttons 1 and 2. The system control unit 50 determines that a slide operation has been performed when a movement in any of the eight directions or a movement in one of or both the x-axis direction and the y-axis direction of a two-dimensional directions is detected. In the present embodiment, the AF-ON buttons 1 and 2 are assumed to be infrared system touch sensors. Alternatively, touch sensors adopting other systems including a resistive film system, a surface acoustic wave system, a capacitance system, an electromagnetic induction system, an image recognition system, and an optical sensor system may be used as the AF-ON buttons 1 and 2.

A structure of the AF-ON button 1 will be described with reference to FIGS. 3A and 3B. Since a structure of the AF-ON button 2 is similar to that of the AF-ON button 1, a description thereof will be omitted.

A cover 310 is an external cover of the AF-ON button 1. A window 311 is a part of the external cover of the AF-ON button 1 and transmits light projected from a light projecting unit 312. The cover 310 protrudes further outward than an external cover 301 of the camera 100 and is depressible. The light projecting unit 312 is a light-emitting device such as a light-emitting diode which irradiates light directed toward the window 311. The light emitted from the light projecting unit 312 is desirably light (infrared light) which is not visible light. When a finger 300 is in touch with a surface of the window 311 (an operation surface of the AF-ON button 1), light irradiated from the light projecting unit 312 is reflected by a surface of the finger 300 which is in touch and reflected light is received (sensed) by a light receiving unit 313. The light receiving unit 313 is an image sensor. On the basis of an image sensed by the light receiving unit 313, a detection can be made as to whether or not a state exists where an operating body (the finger 300) is not in contact with the operation surface of the AF-ON button 1, whether or not the operating body has touched the AF-ON button 1, whether or not the touching operating body is moving while maintaining the touch (whether or not a slide operation is being performed), and the like. The cover 310 is installed on a contact surface 316 using an elastic member 314, and when the finger 300 pushes a surface of the window 311 and the cover 310 is depressed, the cover 310 comes into contact with a switch 315 for depression detection. Accordingly, a depression of the AF-ON button 1 is detected.

Figure 3A:
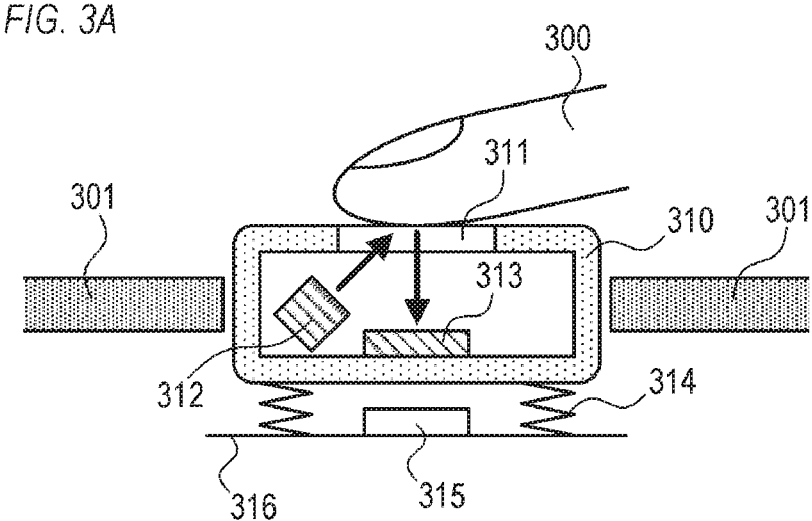
FIGS. 3A and 3B are diagrams representing a structure of an AF-ON button according to the present embodiment.
Figure 3B:
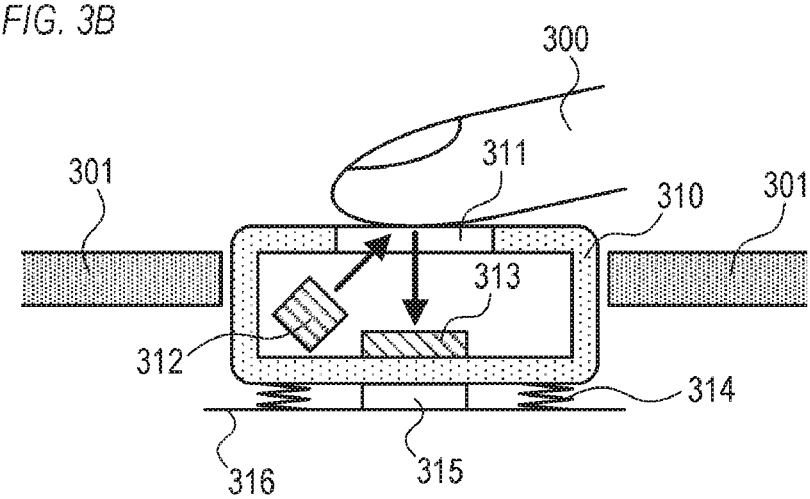

FIG. 3A is a schematic view of a state where the finger 300 has touched the operation surface of the AF-ON button 1 but has not depressed the AF-ON button 1. FIG. 3B is a schematic view of a state where the finger 300 has pressed the operation surface of the AF-ON button 1 to depress the AF-ON button 1 and the depression of the AF-ON button 1 is detected. By separating the finger 300 from the operation surface of the AF-ON button 1 in the depressed state shown in FIG. 3B, the AF-ON button 1 is restored by a force of the elastic member 314 to the state shown in FIG. 3A where the AF-ON button 1 is not in contact with the switch 315. While an example in which the elastic member 314 is installed on the contact surface 316 has been described, the elastic member 314 may be installed on the external cover 301 instead of the contact surface 316. In addition, the AF-ON button 1 is not limited to a button having the structure shown in FIGS. 3A and 3B and may have other structures as long as a depression of the operation surface and a touch operation on the operation surface can be detected.

With reference to FIGS. 4A to 4D, operations in a case where the present invention is not applied, which represent an example of a problem to be solved by the present embodiment, will be described.

Figure 4A:
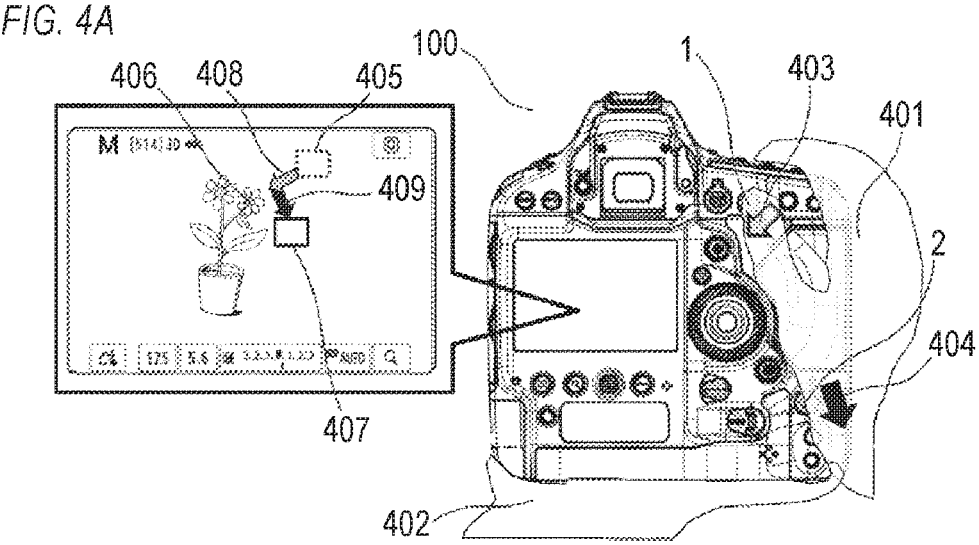
FIGS. 4A to 4D are diagrams for illustrating an example of a problem to be solved by the present embodiment.

FIG. 4A shows an example of a case where laterally-held photography is performed. The user is gripping the first grip portion 101 with the right hand 401 so that the AF-ON button 1 can be operated by the thumb of the right hand 401. In addition, the user supports a main body of the camera 100 with the left hand 402. A ranging point frame 405 displayed on the display unit 28 is an indicator that indicates a focal adjustment position and is also referred to as an AF frame.

In FIG. 4A, the user is intentionally performing a slide operation using the thumb of the right hand 401 in a direction of an arrow 403 with respect to the AF-ON button 1 in order to move the ranging point frame 405 in a direction of an arrow 408 and align the ranging point frame 405 with an object 406 displayed on the display unit 28. However, due to a palm portion of the right hand 401 coining into contact with and rubbing the AF-ON button 2, an unintended slide operation in a direction of an arrow 404 with respect to the AF-ON button 2 is also being performed. Therefore, the system control unit 50 detects the slide operation in the direction of the arrow 403 with respect to the AF-ON button 1 as well as the slide operation in the direction of the arrow 404 with respect to the AF-ON button 2. It should be noted that the directions of the arrows 403 and 404 are merely examples and any direction may be adopted as long as a slide operation can be performed in the direction.

In addition, when control for preventing a malfunction (an unintended action) due to a misoperation (an unintended operation) of the AF-ON buttons 1 and 2 is not performed, the ranging point frame 405 moves in both directions of the arrow 408 and an arrow 409 and ends up becoming a ranging point frame 407 at a position that is not aligned with the object 406. In other words, a malfunction due to a misoperation with respect to the AF-ON button 2 prevents the ranging point frame 405 from being moved to a position intended by the user. It should be noted that the direction of the arrow 408 is a direction in which the ranging point frame 405 moves in accordance with the slide operation detected as an operation with respect to the AF-ON button 1 and is a same direction as the arrow 403. The direction of the arrow 409 is a direction in which the ranging point frame 405 moves in accordance with the slide operation detected as an operation with respect to the AF-ON button 2 and is a same direction as the arrow 404.

A method of switching between enabling and disabling an operation with respect to each of a plurality of touch panels on the basis of a detection result of an orientation of an imaging apparatus is conceivable as a method of preventing a malfunction due to a misoperation with respect to the plurality of touch panels. In other words, control is performed so that, when the imaging apparatus is in an orientation of a lateral position (the orientation shown in FIG. 4A), the lateral AF-ON button 1 is enabled and the AF-ON button 2 is disabled. In addition, control is performed so that, when the imaging apparatus is in an orientation of a vertical position (the orientation shown in FIG. 4B), the vertical AF-ON button 2 is enabled and the AF-ON button 1 is disabled. However, even when using this method, a malfunction (an unintended action) due to a misoperation (an unintended operation) of the AF-ON buttons 1 and 2 may still occur.

Figure 4B:
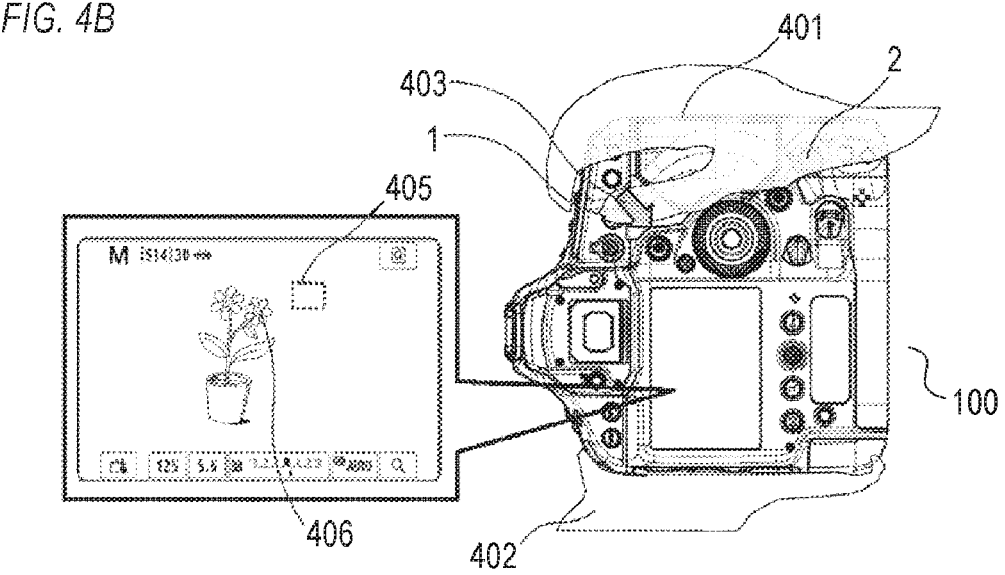

FIG. 4B shows an example of a case where the camera 100 is rotated by 90 degrees counterclockwise from the state shown in FIG. 4A and vertically-held photography is performed. Since the AF-ON button 1 is mainly used for laterally-held photography and the AF-ON button 2 is mainly used for vertically-held photography, operations with respect to the AF-ON button 1 may conceivably be disabled during vertically-held photography. However, the second grip portion 102 is not always gripped by the right hand 401 of the user during vertically-held photography and, alternatively, the first grip portion 101 may be gripped by the right hand 401 as shown in FIG. 4B to operate operation members including the AF-ON button 1. Therefore, disabling operations with respect to the AF-ON button 1 during vertically-held photography causes an occurrence of a malfunction by disabling intentional operations with respect to the AF-ON button 1 while enabling unintended operations with respect to the AF-ON button 2. Disabling of intentional operations and malfunctions due to unintended operations also occur when disabling operations with respect to the AF-ON button 2 during vertically-held photography, disabling operations with respect to the AF-ON button 1 during laterally-held photography, and disabling operations with respect to the AF-ON button 2 during laterally-held photography.

Figure 4C:
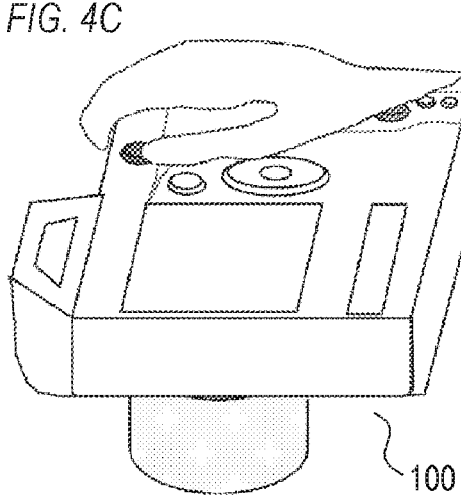
Figure 4D:
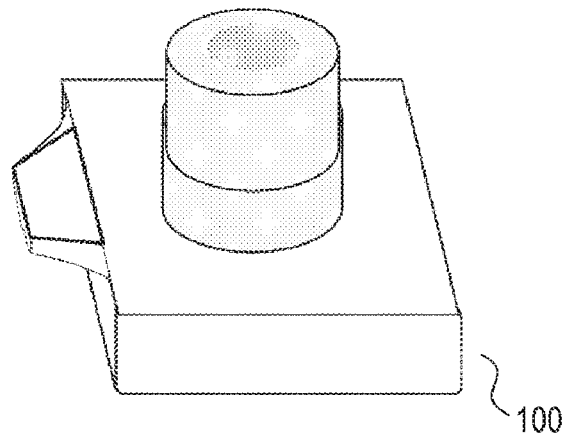

In addition, photography may be performed in an orientation where the camera 100 is pointed directly downward as shown in FIG. 4C or an orientation where the camera 100 is pointed directly upward as shown in FIG. 4D. In orientations such as those shown in FIGS. 4C and 4D, it is difficult to switch between enabling and disabling operations in a suitable manner on the basis of a detection result of an orientation and disabling of intentional operations and malfunctions due to unintended operations are more likely to occur as compared to other orientations.

Figure 5:
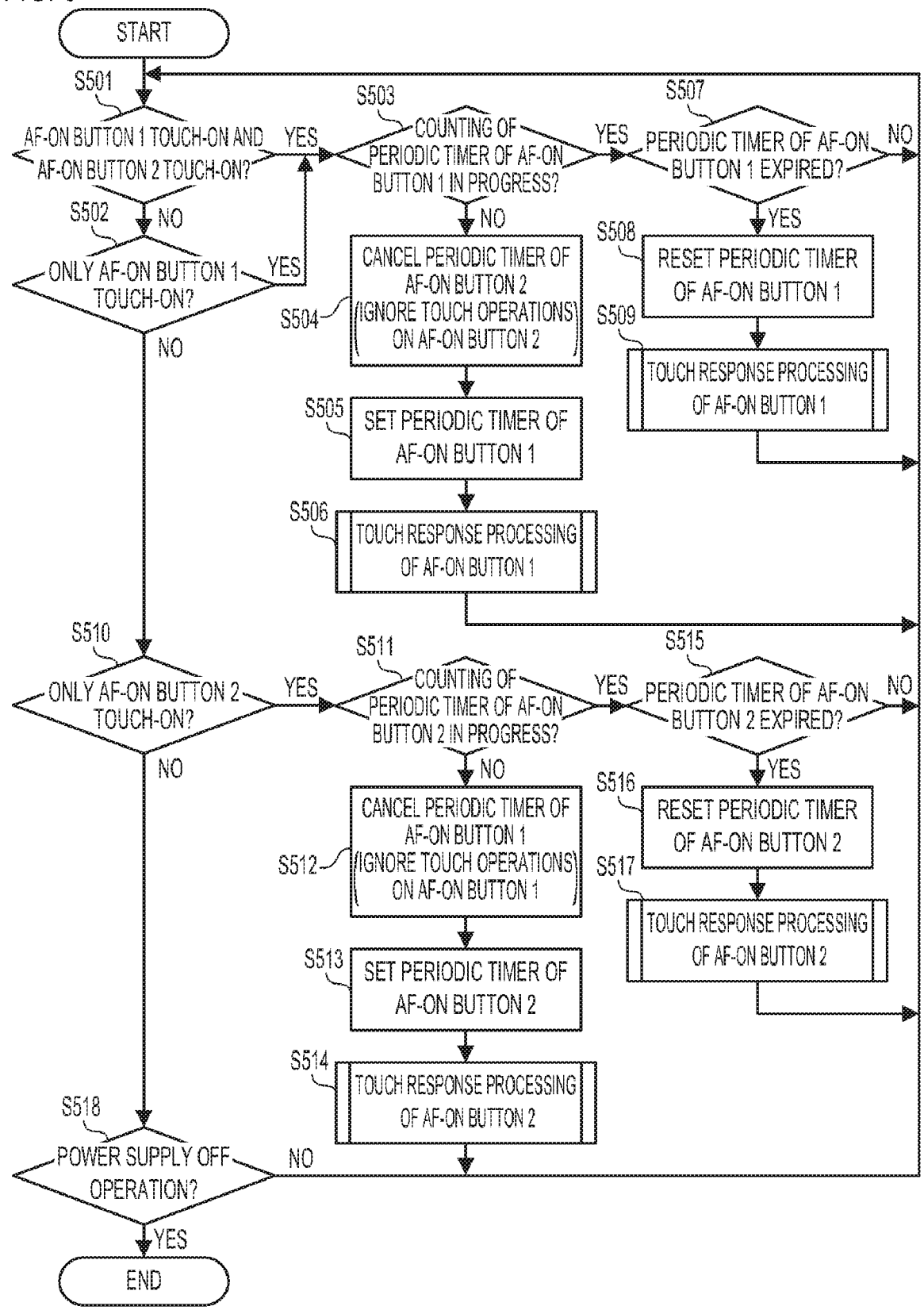
FIG. 5 is a flow chart of repetitive processing according to the present embodiment.

Next, control according to the present embodiment which solves the problems described with reference to FIGS. 4A to 4D will be described. FIG. 5 is a flow chart showing details of repetitive processing (a device interrupt handler) which are repetitively performed by the camera 100 in an activated state. Each processing in the flow chart is realized as the system control unit 50 deploys a program stored in the nonvolatile memory 56 onto the system memory 52 and executes the program.

In S501, the system control unit 50 determines whether or not both the state of the AF-ON button 1 and the state of the AF-ON button 2 are touch-on. When both states are touch-on, the flow proceeds to S503, but otherwise proceeds to S502.

In S502, the system control unit 50 determines whether or not only the state of the AF-ON button 1 is touch-on. When only the state of the AF-ON button 1 is touch-on, the flow proceeds to S503, but otherwise proceeds to S510.

In S503, the system control unit 50 determines whether or not counting of a periodic timer of the AF-ON button 1 is in progress. The periodic timer of the AF-ON button 1 is a timer for detecting a timing of touch response processing that is periodically performed in accordance with a touch operation with respect to the AF-ON button 1. When counting is in progress, the flow proceeds to S507, but otherwise the system control unit 50 assumes that a touch operation with respect to the AF-ON button 1 has just been started and the flow proceeds to S504. It should be noted that a time of the periodic tinier is not particularly limited and the touch response processing may be consecutively performed.

In S504, the system control unit 50 controls the system timer 53 and stops (cancels) a periodic timer of the AF-ON button 2. The periodic tinier of the AF-ON button 2 is a timer for detecting a timing of touch response processing that is periodically performed in accordance with a touch operation with respect to the AF-ON button 2. By stopping the periodic timer of the AF-ON button 2, touch response processing of the AF-ON button 2 is no longer performed (touch operations with respect to the AF-ON button 2 are ignored and disabled). Therefore, when both the state of the AF-ON button 1 and the state of the AF-ON button 2 are touch-on, it is assumed that the user only performs a touch operation with respect to the AF-ON button 1. As a result, (regardless of the orientation of the camera 100), when touch operations to both the AF-ON button 1 and the AF-ON button 2 have been performed, touch response processing in accordance with the touch operation with respect to the AF-ON button 1 is performed without responding to the touch operation with respect to the AF-ON button 2. Accordingly, a malfunction such as that described with reference to FIGS. 4A and 4B can be prevented and the possibility of an occurrence of a malfunction due to misoperations of the AF-ON buttons 1 and 2 can be further reduced.

In S505, the system control unit 50 sets the periodic timer of the AF-ON button 1 with respect to the system timer 53. Accordingly, counting of the periodic timer of the AF-ON button 1 is started.

In S506, the system control unit 50 performs touch response processing of the AF-ON button 1. Details of the touch response processing of the AF-ON button 1 will be described later with reference to FIG. 6.

In S507, the system control unit 50 determines whether or not the periodic timer of the AF-ON button 1 has expired. When the periodic timer has expired, the flow proceeds to S508, but otherwise proceeds to S501.

In S508, the system control unit 50 resets the periodic timer of the AF-ON button 1 with respect to the system timer 53. Accordingly, counting of the periodic timer of the AF-ON button 1 is restarted.

In S509, the system control unit 50 performs touch response processing of the AF-ON button 1. Details of the touch response processing of the AF-ON button 1 will be described later with reference to FIG. 6.

In S510, the system control unit 50 determines whether or not only the state of the AF-ON button 2 is touch-on. In other words, the system control unit 50 determines whether or not a state exists where the AF-ON button 1 is not touched but the AF-ON button 2 is touched. When only the state of the AF-ON button 2 is touch-on, the flow proceeds to S511, but otherwise proceeds to S518.

In S511, the system control unit 50 determines whether or not counting of a periodic timer of the AF-ON button 2 is in progress. When counting is in progress, the flow proceeds to S515, but otherwise the system control unit 50 assumes that a touch operation with respect to the AF-ON button 2 has just been started and the flow proceeds to S512.

In S512, the system control unit 50 controls the system timer 53 and stops (cancels) a periodic timer of the AF-ON button 1. By stopping the periodic timer of the AF-ON button 1, touch response processing of the AF-ON button 1 is no longer performed. In this case, since the AF-ON button 1 is not touched, the system control unit 50 may advance to S513 without performing the processing of S512. Even by doing so, the touch response processing of the AF-ON button 1 is not performed.

In S513, the system control unit 50 sets the periodic timer of the AF-ON button 2 with respect to the system timer 53. Accordingly, counting of the periodic timer of the AF-ON button 2 is started.

In S514, the system control unit 50 performs touch response processing of the AF-ON button 2. Details of the touch response processing of the AF-ON button 2 will be described later with reference to FIG. 7.

In S515, the system control unit 50 determines whether or not the periodic timer of the AF-ON button 2 has expired. When the periodic timer has expired, the flow proceeds to S516, but otherwise proceeds to S501.

In S516, the system control unit 50 resets the periodic timer of the AF-ON button 2 with respect to the system timer 53. Accordingly, counting of the periodic timer of the AF-ON button 2 is restarted.

In S517, the system control unit 50 performs touch response processing of the AF-ON button 2. Details of the touch response processing of the AF-ON button 2 will be described later with reference to FIG. 7.

In S518, the system control unit 50 determines whether or not a power supply OFF operation (an operation with respect to the power supply switch 72) for turning the power supply of the camera 100 off has been performed. When a power supply OFF operation has been performed, the system control unit 50 ends the repetitive processing shown in FIG. 5 and turns the power supply of the camera 100 off, but otherwise the flow proceeds to S501.

While switching of processing is performed in accordance with touch states with respect to the AF-ON buttons 1 and 2 in the repetitive processing shown in FIG. 5, the switching of processing is not limited thereto. For example, the switching of processing may be performed in accordance with states of the shutter buttons 103 and 105. Specifically, the switching of processing may be performed so that, during an operation of the shutter button 103, the touch response processing of the AF-ON button 2 is not performed even if a touch operation with respect to the AF-ON button 1 is not performed but a touch operation with respect to the AF-ON button 2 is performed. The switching of processing may be performed so that, during an operation of the shutter button 105, the touch response processing of the AF-ON button 1 is not performed even if a touch operation with respect to the AF-ON button 1 is performed.

FIG. 6 is a flow chart showing details of the touch response processing of the AF-ON button 1 (S506 and S509 in FIG. 5). Each processing in the flow chart is realized as the system control unit 50 deploys a program stored in the nonvolatile memory 56 onto the system memory 52 and executes the program.

In S601, the system control unit 50 acquires a movement amount (x, y) of a touch operation with respect to the AF-ON button 1 on the basis of output information of the AF-ON button 1, and stores the acquired movement amount (x, y) in the system memory 52. When the movement amount (x, y)

of a touch operation with respect to the AF-ON button 1 is stored in the system memory 52, the system control unit 50 updates the stored movement amount (x, y) with the acquired movement amount (x, y).

In S602, the system control unit 50 acquires a movement direction of the touch operation with respect to the AF-ON button 1 on the basis of the output information of the AF-ON button 1, and stores the acquired movement direction in the system memory 52. When the movement direction of the touch operation with respect to the AF-ON button 1 is stored in the system memory 52, the system control unit 50 updates the stored movement direction with the acquired movement direction.

In S603, when the movement amount (x, y) of a touch operation with respect to the AF-ON button 2 is stored in the system memory 52, the system control unit 50 updates the stored movement amount (x, y) to 0.

In S604, when the movement direction of the touch operation with respect to the AF-ON button 2 is stored in the system memory 52, the system control unit 50 updates the stored movement direction to "no movement".

In S605, the system control unit 50 determines whether or not any of the following holds true: photometry by the AE sensor 17 is in progress; counting of a photometric timer by the system timer 53 is in progress; and selection of a ranging point is in progress. When any of the above holds true, the flow proceeds to S606, but otherwise ends the touch response processing shown in FIG. 6.

In S606, the system control unit 50 determines (calculates) a position after movement of a ranging point frame displayed on the display unit 28 using the movement amount (x, y) and the movement direction held by the system memory 52 or, in other words, the movement amount (x, y) and the movement direction of the touch operation with respect to the AF-ON button 1. In addition, the system control unit 50 moves the ranging point frame to the determined position.

FIG. 7 is a flow chart showing details of the touch response processing of the AF-ON button 2 (S514 and S517 in FIG. 5). Each processing in the flow chart is realized as the system control unit 50 deploys a program stored in the nonvolatile memory 56 onto the system memory 52 and executes the program.

In S701, the system control unit 50 acquires a movement amount (x, y) of a touch operation with respect to the AF-ON button 2 on the basis of output information of the AF-ON button 2, and stores the acquired movement amount (x, y) in the system memory 52. When the movement amount (x, y) of a touch operation with respect to the AF-ON button 2 is stored in the system memory 52, the system control unit 50 updates the stored movement amount (x, y) with the acquired movement amount (x, y).

In S702, the system control unit 50 acquires a movement direction of the touch operation with respect to the AF-ON button 2 on the basis of the output information of the AF-ON button 2, and stores the acquired movement direction in the system memory 52. When the movement direction of the touch operation with respect to the AF-ON button 2 is stored in the system memory 52, the system control unit 50 updates the stored movement direction with the acquired movement direction.

In S703, when the movement amount (x, y) of a touch operation with respect to the AF-ON button 1 is stored in the system memory 52, the system control unit 50 updates the stored movement amount (x, y) to 0.

In S704, when the movement direction of the touch operation with respect to the AF-ON button 1 is stored in the system memory 52, the system control unit 50 updates the stored movement direction to "no movement".

In S705, the system control unit 50 determines whether or not any of the following holds true: photometry by the AE sensor 17 is in progress; counting of a photometric timer by the system timer 53 is in progress; and selection of a ranging point is in progress. When any of the above holds true, the flow proceeds to S706, but otherwise ends the touch response processing shown in FIG. 7.

In S706, the system control unit 50 determines (calculates) position after movement of a ranging point frame displayed on the display unit 28 using the movement amount (x, y) and the movement direction held by the system memory 52 or, in other words, the movement amount (x, y) and the movement direction of the touch operation with respect to the AF-ON button 2. In addition, the system control unit 50 moves the ranging point frame to the determined position.

Figure 8A:
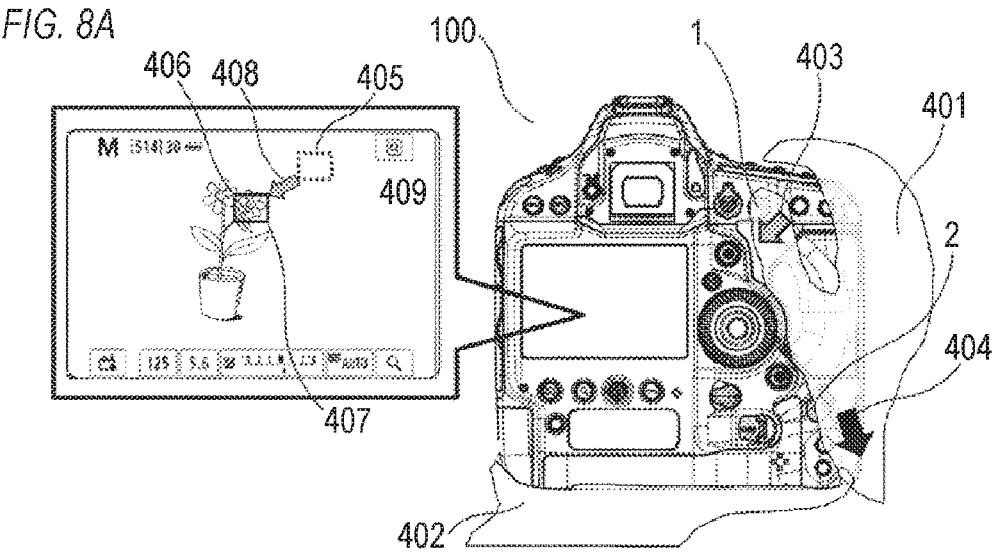
FIGS. 8A and 8B are diagrams for illustrating an example of an effect by the present embodiment.

An example of an effect produced by the present embodiment will be described with reference to FIGS. 8A and 8B. FIG. 8A shows an example of a case where laterally-held photography is performed in a similar manner to FIG. 4A. In FIG. 8A, similarly, the user is gripping the first grip portion 101 with the right hand 401 and intentionally performing a slide operation using the thumb of the right hand 401 in a direction of the arrow 403 with respect to the AF-ON button 1 in order to align the ranging point frame 405 with the object 406. At the same time, an unintended slide operation in a direction of the arrow 404 with respect to the AF-ON button 2 is also being performed. Therefore, the system control unit 50 detects the slide operation in the direction of the arrow 403 with respect to the AF-ON button 1 as well as the slide operation in the direction of the arrow 404 with respect to the AF-ON button 2. However, by performing the processing shown in FIGS. 5 and 6, the system control unit 50 moves the ranging point frame 405 only using the movement amount (x, y) and the movement direction of the slide operation with respect to the AF-ON button 1 without using the movement amount (x, y) and the movement direction of the slide operation with respect to the AF-ON button 2. Accordingly, the ranging point frame 405 can be moved in intended directions (the arrows 403 and 408) of the slide operations and a malfunction when touch operations are performed with respect to both the AF-ON button 1 and the AF-ON button 2 can be suppressed.

Figure 8B:
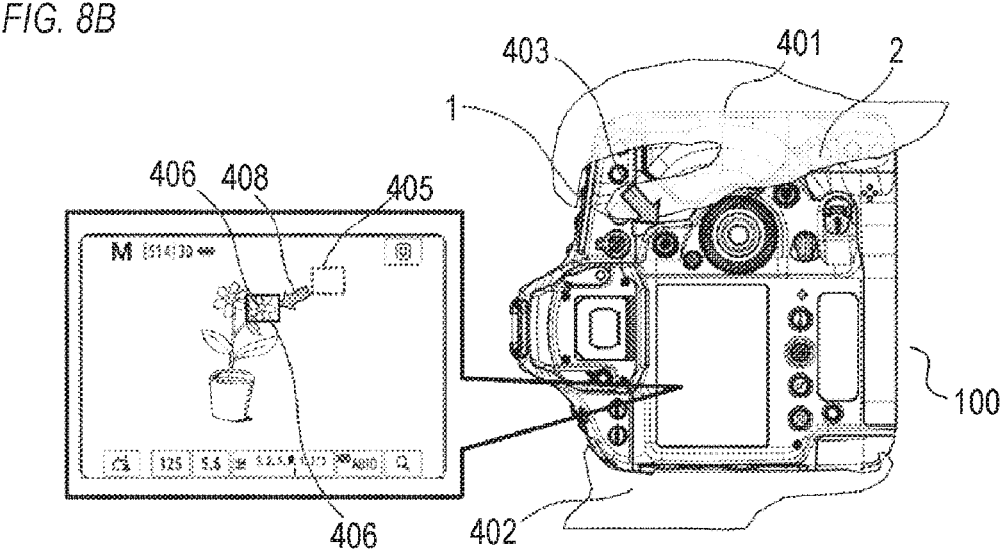

In a similar manner to FIG. 4B, FIG. 8B shows an example of a case where vertically-held photography is performed. In FIG. 8B, similarly in FIG. 8A, the user is gripping the first grip portion 101 with the right hand 401 and intentionally performing a slide operation using the thumb of the right hand 401 in a direction of the arrow 403 with respect to the AF-ON button 1. In the processing shown in FIGS. 5 to 7, the system control unit 50 does not perform processing for causing the orientation detecting unit 55 to detect an orientation of the camera 100 or processing using a detection result of the orientation. Therefore, even in a situation such as that shown in FIG. 8B, unintended disabling of operations due to orientation detection does not occur and the ranging point frame 405 can be moved in intended directions (the arrows 403 and 408) of the slide operations. A similar operational effect is obtained regardless of the orientation of the camera 100 (in any of the orientations shown in FIGS. 4A to 4D, 8A, and 8B).

It should be noted that the various controls described above as controls to be performed by the system control unit 50 may be carried out by one piece of hardware or a plurality of pieces of hardware (for example, a plurality of processors or circuits) may control an entire apparatus by sharing processing.

In addition, while the present invention has been described in detail on the basis of a preferred embodiment thereof, it is to be understood that the present invention is not limited to the specific embodiment and various modes that do not constitute departures from the scope of the invention are also included in the present invention. Furthermore, the embodiment described above simply represents an example of the present invention and the embodiment can also be combined with other embodiments. For example, the various types of control described with reference to FIGS. 5 to 7 are not only applicable to the AF-ON buttons 1 and 2 but are also applicable to other operation members (a touch panel, an operation member that instructs a distance by being tilted, and the like).

Moreover, while an example in which the present invention is applied to an imaging apparatus has been described in the embodiment presented above, the present invention is not limited to this example and can be applied to any electronic device having a plurality of operation members. For example, the present invention can be applied to a personal computer, a PDA, a mobile phone terminal, a mobile image viewer, a printer apparatus, a digital photo frame, a music player, a game device, an electronic book reader, a video player, a display apparatus (including a projection apparatus), a tablet terminal, a smartphone, an AI speaker, a home electrical appliance, a vehicle-mounted apparatus, and the like.

According to the present disclosure, the possibility of an occurrence of a malfunction (an unintended action) due to a misoperation unintended operation) can be further reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-079152, filed on Apr. 18, 2019, which is hereby incorporated by reference herein in its entirety.

What is claimed is:

1. An electronic device comprising:
a first operation member configured to detect a touch operation wherein the first operation member is operatable by a thumb of a hand holding a first grip portion provided along a first side on a first surface of the electronic device;
a second operation member configured to detect a touch operation wherein the second operation member is disposed at a position where the second operation member is operatable by a thumb of a hand holding a second grip portion provided along a second side that is adjacent to the first side on the first surface, the position being closer to a vertex formed by the first side and the second side than to other vertices on the first surface; and
at least one memory and at least one processor which function as:
a control unit configured to perform control so as to execute a predetermined function for moving an indicator displayed on a display in accordance with a moving operation of a touch position to the first operation member and to execute the predetermined function in accordance with a moving operation of a touch position to the second operation member, and, in a case where the touch operations to both the first operation member and the second operation member are made, to execute the predetermined function in accordance with the moving operation of the touch position to the first operation member without responding to the moving operation of the touch position to the second operation member, wherein
the touch operation to the first operation member, the touch operation to the second operation member, a depressing operation to the first operation member, and a depressing operation to the second operation member are allowed, and the control unit performs control so as to move the indicator in accordance with the moving operation of the touch position performed to the first operation member, execute a second function on a basis of a position of the indicator in accordance with the depressing operation to the first operation member, move the indicator in accordance with the moving operation of the touch position performed to the second operation member, and execute the second function on a basis of the position of the indicator in accordance with the depressing operation to the second operation member.

2. The electronic device according to claim 1, wherein the control unit performs control so that, regardless of an orientation of the electronic device, in a case where the touch operations to both the first operation member and the second operation member are made, the predetermined function is executed in accordance with the moving operation of the touch position to the first operation member without responding to the moving operation of the touch position to the second operation member.

3. The electronic device according to claim 1, wherein the second operation member is disposed at a position closer to an opposite-side end that is an end of the first side and is opposite to an end where the first operation member is located than to the end where the first operation member is located.

4. The electronic device according to claim 1, wherein the electronic device is an imaging apparatus including an image sensor.

5. The electronic device according to claim 4, wherein the predetermined function is a function for moving an indicator which is displayed on a display and which indicates a focal adjustment position.

6. The electronic device according to claim 4, wherein the control unit,
in a case during one of photometry, counting of a photometric timer, and selection of a ranging point, performs control so as to execute the predetermined function in accordance with the moving operation of the touch position to the first operation member and execute the predetermined function in accordance with the moving operation of the touch position to the second operation member; and
in other cases, does not perform control so as to execute the predetermined function even when the moving operation of the touch position to the first operation member is performed and does not perform control so as to execute the predetermined function even when the moving operation of the touch position to the second operation member is performed.

7. The electronic device according to claim 4, further comprising
a first shutter button at a position where the first shutter button is operatable by an index finger of a hand holding the first grip portion, wherein
the first operation member and the second operation member are disposed on the first surface,
the first grip portion and the second grip portion are disposed on a second surface on an opposite side to the first surface, and
the first operation member is disposed at a position that is closer to the first shutter button than the second operation member is.

8. The electronic device according to claim 7, further comprising
a second shutter button at a position where the second shutter button is operatable by an index finger of a hand holding the second grip portion, wherein
the second operation member is disposed at a position that is closer to the second shutter button than the first operation member is.

9. The electronic device according to claim 8, wherein the control unit performs control so as to not execute the predetermined function even when the moving operation of the touch position to the first operation member is not performed and the moving operation of the touch position to the second operation member is performed during an operation of the first shutter button.

10. The electronic device according to claim 8, wherein the control unit performs control so as to not execute the predetermined function even when the moving operation of the touch position to the first operation member is performed during an operation of the second shutter button.

11. The electronic device according to claim 1, wherein the first operation member and the second operation member are different operation members independent of each other.

12. The electronic device according to claim 1, wherein both the first operation member and the second operation member are operation members which are not touch panels and which do not have a display function.

13. A control method of an electronic device,
the electronic device including:
a first operation member configured to detect a touch operation wherein the first operation member is operatable by a thumb of a hand holding a first grip portion provided along a first side on a first surface of the electronic device; and
a second operation member configured to detect a touch operation wherein the second operation member is disposed at a position where the second operation member is operatable by a thumb of a hand holding a second grip portion provided along a second side that is adjacent to the first side on the first surface, the position being closer to a vertex formed by the first side and the second side than to other vertices on the first surface, and
the control method comprising:
performing control so as to execute a predetermined function for moving an indicator displayed on a display in accordance with a moving operation of a touch position to the first operation member;
performing control so as to execute the predetermined function in accordance with a moving operation of a touch position to the second operation member; and
performing control so as to execute the predetermined function in accordance with the moving operation of the touch position to the first operation member without responding to the moving operation of the touch position to the second operation member, in a case where the touch operations to both the first operation member and the second operation member are made, wherein
the touch operation to the first operation member, the touch operation to the second operation member, a depressing operation to the first operation member, and a depressing operation to the second operation member are allowed, and
control is performed so as to move the indicator in accordance with the moving operation of the touch position performed to the first operation member, execute a second function on a basis of a position of the indicator in accordance with the depressing operation to the first operation member, move the indicator in accordance with the moving operation of the touch position performed to the second operation member, and execute the second function on a basis of the position of the indicator in accordance with the depressing operation to the second operation member.

14. A non-transitory computer readable medium that stores a program, wherein the program causes a computer to execute a control method of an electronic device,
the electronic device including:
a first operation member configured to detect a touch operation wherein the first operation member is operatable by a thumb of a hand holding a first grip portion provided along a first side on a first surface of the electronic device; and
a second operation member configured to detect a touch operation wherein the second operation member is disposed at a position where the second operation member is operatable by a thumb of a hand holding a second grip portion provided along a second side that is adjacent to the first side on the first surface, the position being closer to a vertex formed by the first side and the second side than to other vertices on the first surface, and the control method comprising:

performing control so as to execute a predetermined function for moving an indicator displayed on a display in accordance with a moving operation of a touch position to the first operation member;

performing control so as to execute the predetermined function in accordance with a moving operation of a touch position to the second operation member; and performing control so as to execute the predetermined function in accordance with the moving operation of the touch position to the first operation member without responding to the moving operation of the touch position to the second operation member, in a case where the touch operations to both the first operation member and the second operation member are made, wherein the touch operation to the first operation member, the touch operation to the second operation member, a depressing operation to the first operation member, and a depressing operation to the second operation member are allowed, and control is performed so as to move the indicator in accordance with the moving operation of the touch position performed to the first operation member, execute a second function on a basis of a position of the indicator in accordance with the depressing operation to the first operation member, move the indicator in accordance with the moving operation of the touch position performed to the second operation member, and execute the second function on a basis of the position of the indicator in accordance with the depressing operation to the second operation member.

* * * * *